(12) United States Patent
Yu

(10) Patent No.: US 9,453,522 B2
(45) Date of Patent: Sep. 27, 2016

(54) SUPPORT RACK

(71) Applicant: Tsung-Yao Yu, Taichung (TW)

(72) Inventor: Tsung-Yao Yu, Taichung (TW)

( * ) Notice: Subject to any disclaimer, the term of this patent is extended or adjusted under 35 U.S.C. 154(b) by 0 days.

(21) Appl. No.: 14/620,242

(22) Filed: Feb. 12, 2015

(65) Prior Publication Data

US 2016/0108942 A1   Apr. 21, 2016

(30) Foreign Application Priority Data

Oct. 16, 2014   (TW) .............................. 103218354 U

(51) Int. Cl.

| | | |
|---|---|---|
| *A47G 1/10* | (2006.01) | |
| *F16B 2/12* | (2006.01) | |
| *F16M 13/00* | (2006.01) | |
| *A47B 97/04* | (2006.01) | |
| *F16B 2/18* | (2006.01) | |
| *F16M 11/04* | (2006.01) | |
| *F16M 11/14* | (2006.01) | |
| *F16M 11/24* | (2006.01) | |
| *A47B 23/04* | (2006.01) | |

(52) U.S. Cl.
CPC ................ *F16B 2/12* (2013.01); *A47B 97/04* (2013.01); *F16B 2/18* (2013.01); *F16M 11/041* (2013.01); *F16M 11/14* (2013.01); *F16M 11/24* (2013.01); *F16M 13/00* (2013.01); *A47B 23/04* (2013.01)

(58) Field of Classification Search
CPC ............ F16B 2/12; F16B 2/18; A47B 97/04; A47B 23/04; F16M 13/00; F16M 11/041; F16M 11/14; F16M 11/24

USPC ........ 248/313, 316.5, 346.06, 346.07, 346.3, 248/297.31, 441.1, 449, 679.21, 918–924, 248/447; 361/679.21

See application file for complete search history.

(56) References Cited

U.S. PATENT DOCUMENTS

| | | | | |
|---|---|---|---|---|
| 2,185,084 | A * | 12/1939 | Hutaff, Jr. ............. | B60R 13/105 248/316.5 |
| 5,181,686 | A * | 1/1993 | Barthel ................... | F26B 25/18 248/173 |
| 7,543,790 | B2 * | 6/2009 | Starcher ................. | A47B 97/08 248/163.1 |
| 8,020,818 | B2 * | 9/2011 | Chou ..................... | F16M 11/10 248/165 |
| 8,162,281 | B2 * | 4/2012 | Logue ................... | A47B 97/08 248/447 |

\* cited by examiner

*Primary Examiner* — Gwendolyn Baxter
(74) *Attorney, Agent, or Firm* — Alan D. Kamrath; Kamrath IP Lawfirm, P.A.

(57) ABSTRACT

A support rack includes a base, and two supporting units. Each of the supporting units includes a support seat. The support seat of each of the supporting units is pivotally connected with the base and extends downward. The support seat of each of the supporting units includes a pivot end pivotally connected with the base, and a mounting portion located opposite to the pivot end. The pivot end of the support seat of each of the supporting units is pivotable relative to the base to adjust the distance between the mounting portions of the supporting units.

10 Claims, 9 Drawing Sheets

SUPPORT RACK

BACKGROUND OF THE INVENTION

1. Field of the Invention

The present invention relates to a personal item and, more particularly, to a support rack.

2. Description of the Related Art

A conventional support rack in accordance with the prior art shown in FIG. 1 comprises a supporting member 11, two holders 12 extending downward from the supporting member 11 in an inclined manner, and a clamping seat 13 retractably mounted on the supporting member 11 and extending upward from the supporting member 11. When an article 14, such as a tablet computer, a book, a music score or the like, is placed on the supporting member 11 and held by the holders 12, the clamping seat 13 is pressed downward to clamp the article 14, so that the article 14 is positioned between the holders 12 and the clamping seat 13. However, the holders 12 are secured on the supporting member 11, and the distance between the holders 12 is fixed and cannot be adjusted, so that the conventional support rack has a fixed width that is suitable for an article with a fixed width. Thus, the conventional support rack is not available for articles of different sizes and specifications.

BRIEF SUMMARY OF THE INVENTION

The primary objective of the present invention is to provide a support rack whose width can be adjusted freely so that the support rack is available for articles of different sizes and specifications.

In accordance with the present invention, there is provided a support rack comprising a base, and two supporting units. Each of the supporting units includes a support seat. The support seat of each of the supporting units is pivotally connected with the base and extends downward. The support seat of each of the supporting units includes a pivot end pivotally connected with the base, and a mounting portion located opposite to the pivot end. The pivot end of the support seat of each of the supporting units is pivotable relative to the base to adjust a distance between the mounting portions of the supporting units.

Preferably, each of the supporting units further includes a toothed member arranged on the support seat. The toothed members of the supporting units mesh with each other so that the support seats of the supporting units are pivoted synchronously.

Preferably, the toothed member of each of the supporting units has an arcuate profile. The toothed members of the supporting units mesh with each other along arcuate tangent lines.

Preferably, the support rack further comprises a first positioning member mounted on the base for positioning the toothed member of each of the supporting units.

Preferably, The toothed member of each of the supporting units has a toothed face, and the first positioning member abuts the toothed face of the toothed member of each of the supporting units.

Preferably, the base includes a back cover covering the toothed member of each of the supporting units. The back cover has a cover body for mounting the first positioning member, and a brake member arranged on the cover body. The brake member has a connecting end connected with the cover body and a braking end located opposite to the connecting end. The first positioning member abuts the braking end of the brake member of the back cover, and the braking end of the brake member of the back cover abuts and fixes the toothed face of the toothed member of at least one of the supporting units.

Preferably, the first positioning member includes a pivot portion pivotally connected with the back cover of the base, a protruding block extending from the pivot portion and abutting the braking end of the brake member, and a handle located opposite to the protruding block. The first positioning member is rotatable relative to the back cover between a locked position and an unlocked position. When the first positioning member is disposed at the locked position, the protruding block of the first positioning member abuts the braking end of the brake member of the back cover. When the first positioning member is disposed at the unlocked position, the protruding block of the first positioning member is detached from the braking end of the brake member of the back cover.

Preferably, the toothed face of the toothed member of each of the supporting units has a plurality of anti-skid grooves to enhance the friction between the braking end of the brake member of the back cover and the toothed face of the toothed member of each of the supporting units.

Preferably, each of the supporting units further includes a resting member mounted on the mounting portion of the support seat.

Preferably, the support seat of each of the supporting units further includes a stepped slot formed in the mounting portion, and a pivoting hole formed in the mounting portion. The resting member of each of the supporting units includes a holder, a limit rod formed on the holder and slidably mounted in the stepped slot, and a pivot shaft formed on the holder and pivotally mounted in the pivoting hole, so that the holder of the resting member of each of the supporting units is pivotable relative to the support seat.

Preferably, the support rack further comprises a clamping member retractably mounted on the base and extends upward from the base.

According to the primary advantage of the present invention, the distance between the supporting units is adjusted by adjusting the opening angle of the support seats and by adjusting the angles of the resting members, so that the width of the support rack can be adjusted.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
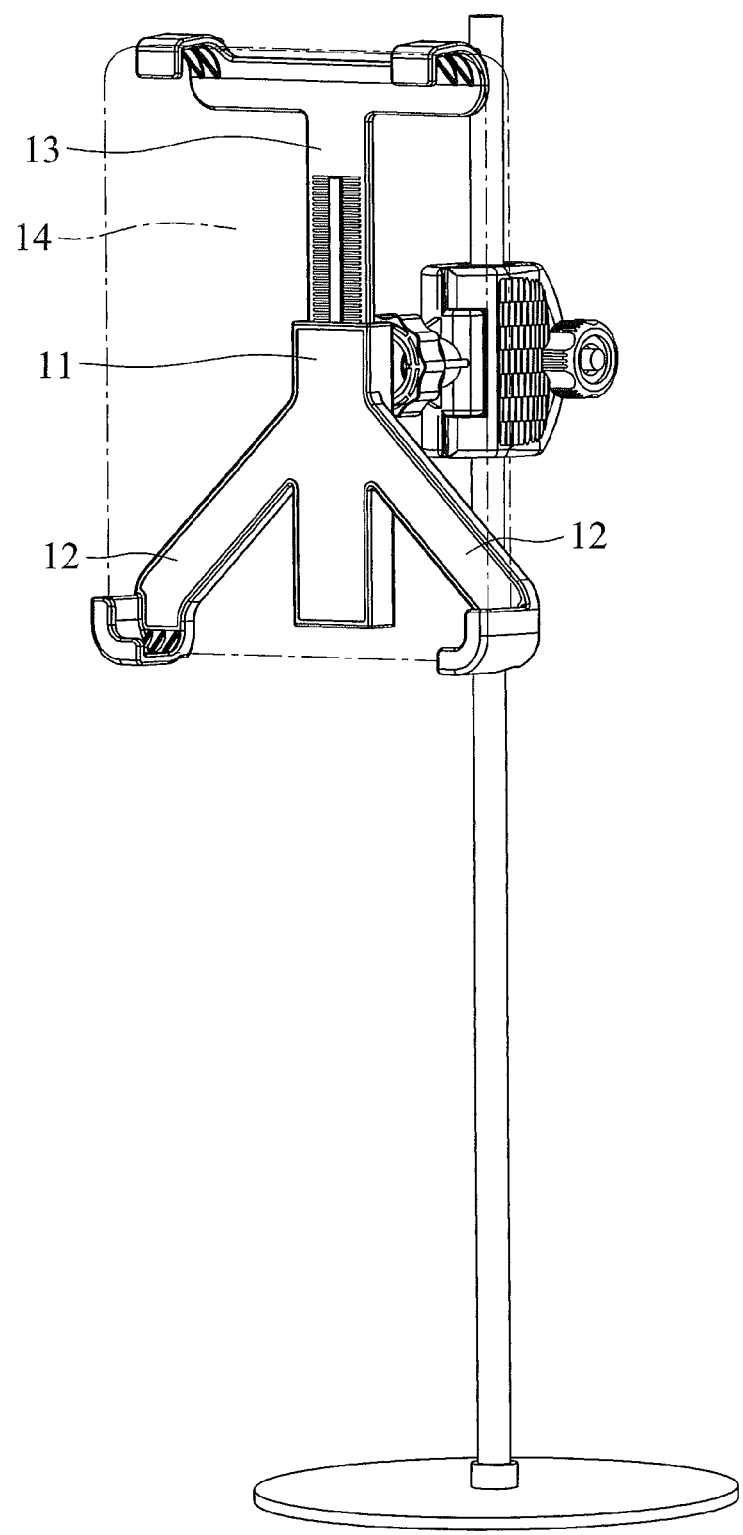
FIG. 1 is a perspective view of a conventional support rack in accordance with the prior art.
Figure 2:
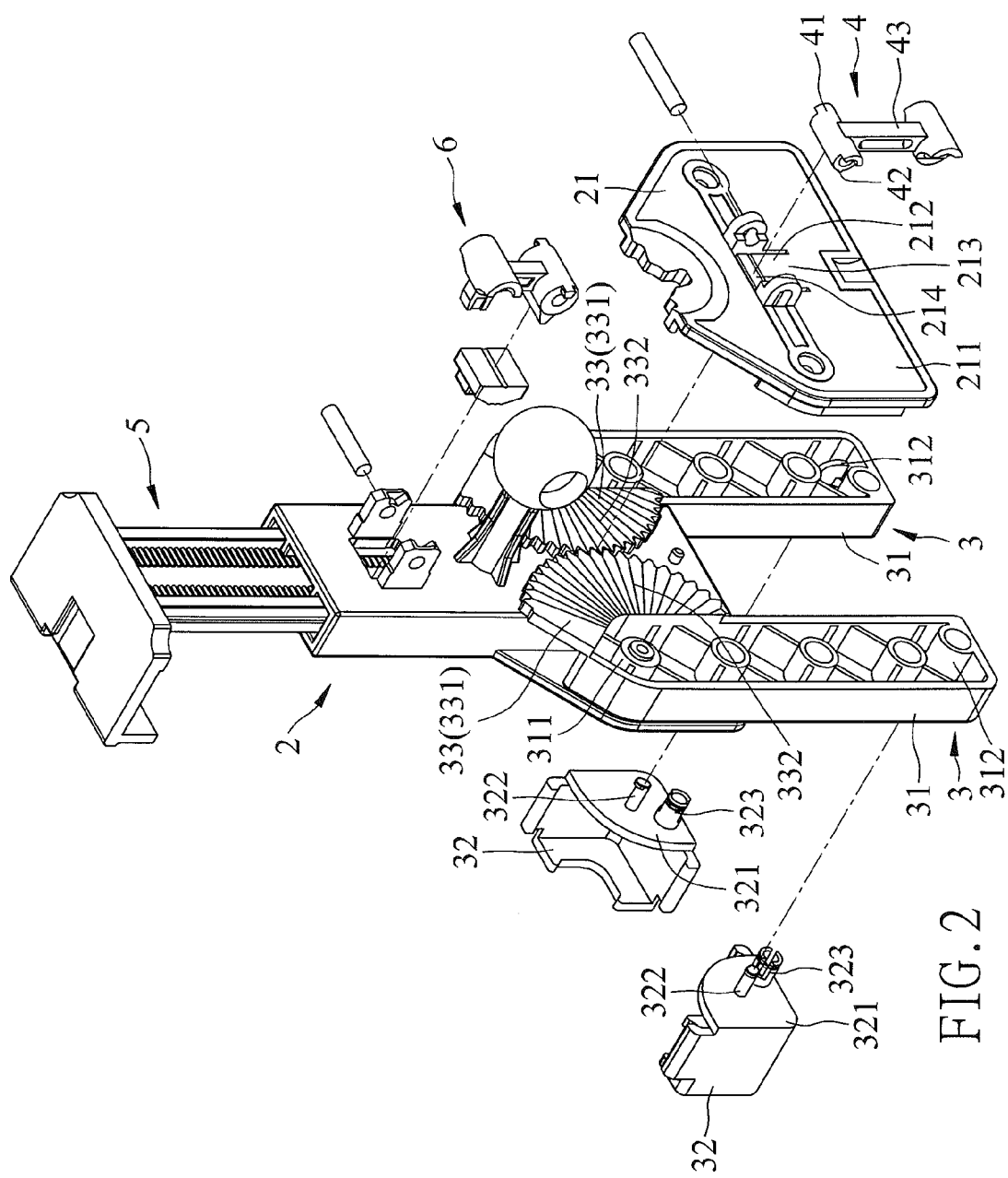
FIG. 2 is an exploded perspective view of a support rack in accordance with the preferred embodiment of the present invention.
Figure 3:
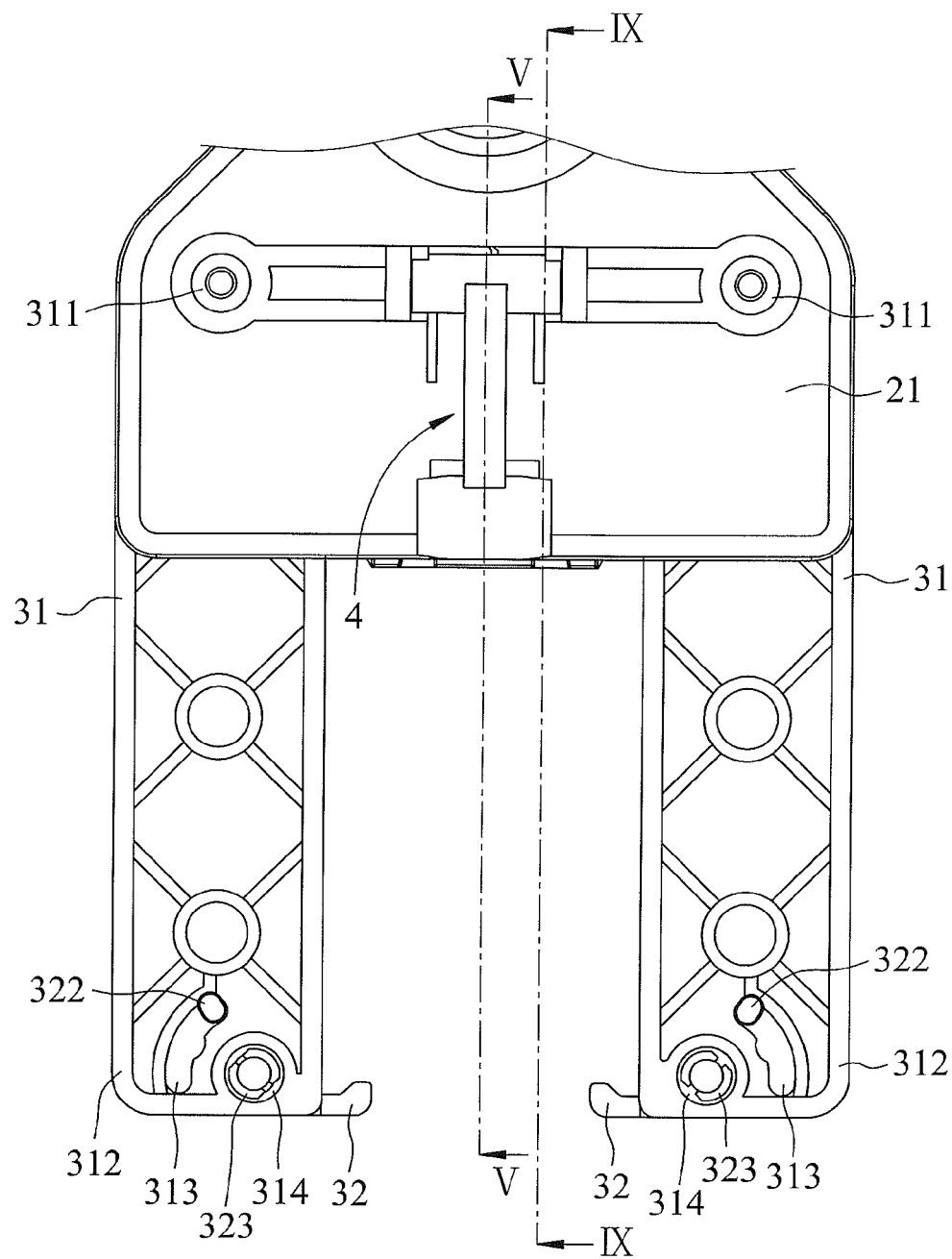
FIG. 3 is a partially rear assembly view of the support rack as shown in FIG. 2.
Figure 4:
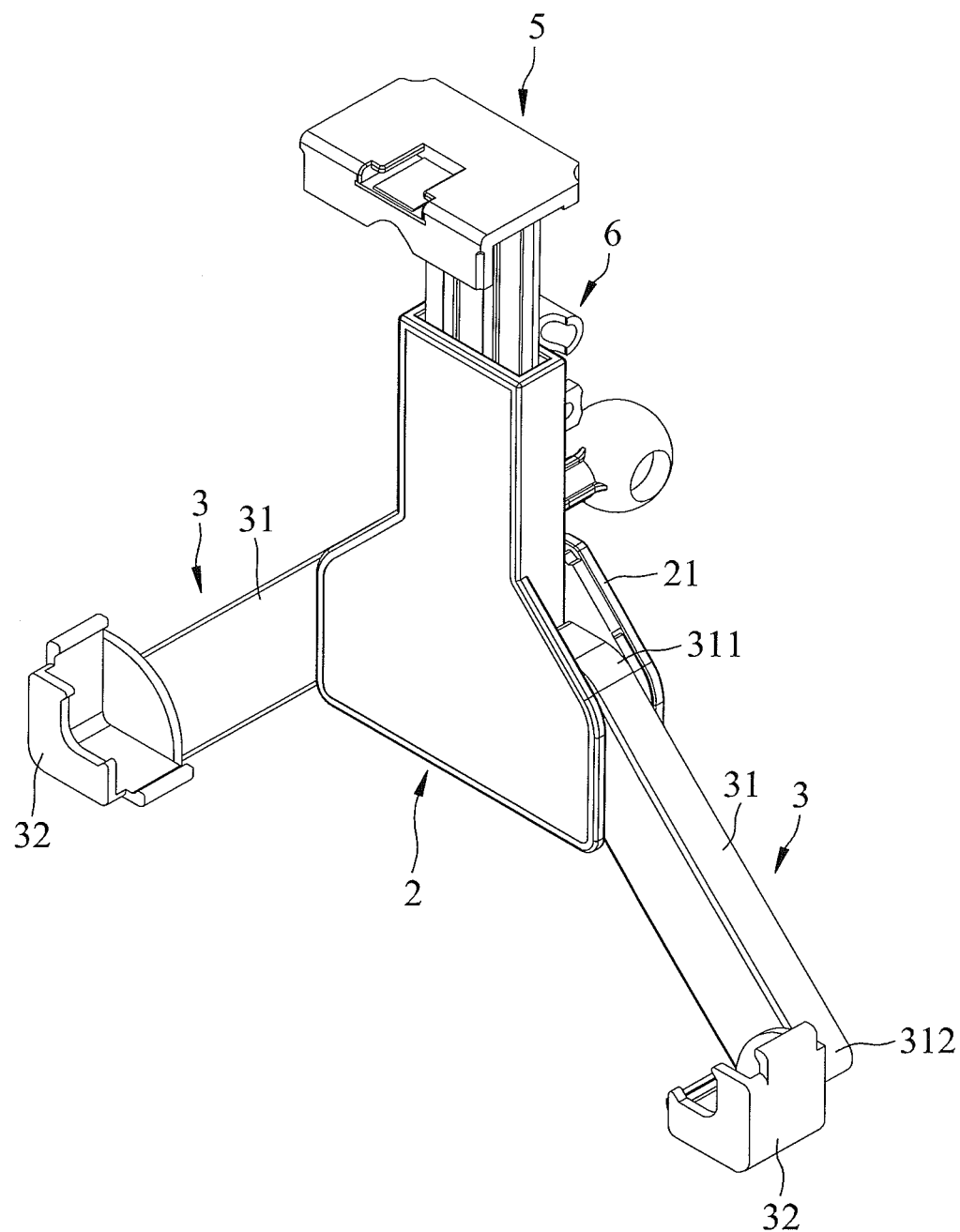
FIG. 4 is a perspective assembly view of the support rack as shown in FIG. 2.

Referring to the drawings and initially to FIGS. 2-4, a support rack in accordance with the preferred embodiment of the present invention comprises a base 2, two supporting units 3, a first positioning member 4, a clamping member 5, and a second positioning member 6.

The base 2 includes a back cover 21. The back cover 21 has a cover body 211 for mounting the first positioning member 4, and a brake member 212 arranged on the cover body 211. The brake member 212 is a elastic plate and has a connecting end 213 connected with the cover body 211 and a braking end 214 located opposite to the connecting end 213.

Each of the supporting units 3 includes a support seat 31, a resting member 32, and a toothed member 33.

The support seat 31 of each of the supporting units 3 is pivotally connected with the base 2 and extends downward in an inclined manner. The support seat 31 of each of the supporting units 3 includes a pivot end 311 pivotally connected with the base 2, a mounting portion 312 located opposite to the pivot end 311, an arcuate stepped slot 313 formed in the mounting portion 312, and a pivoting hole 314 formed in the mounting portion 312.

The resting member 32 of each of the supporting units 3 is mounted on the mounting portion 312 of the support seat 31 and includes a holder 321, a limit rod 322 formed on the holder 321 and slidably mounted in the stepped slot 313, and a pivot shaft 323 formed on the holder 321 and pivotally mounted in the pivoting hole 314.

When the holder 321 of the resting member 32 of each of the supporting units 3 is pivoted relative to the support seat 31, the pivot shaft 323 is pivoted in the pivoting hole 314, and the limit rod 322 slides in the stepped slot 313, so that the resting member 32 of each of the supporting units 3 is rotated relative to the support seat 31 to freely adjust the angle of the resting member 32 relative to the support seat 31.

The toothed member 33 of each of the supporting units 3 has an arcuate profile and is mounted on the support seat 31. The toothed members 33 of the supporting units 3 mesh with each other along arcuate tangent lines. The toothed member 33 of each of the supporting units 3 has a toothed face 331 (see FIG. 5), and the braking end 214 of the brake member 212 of the back cover 21 abuts the toothed face 331 of the toothed member 33 of each of the supporting units 3.

The toothed face 331 of the toothed member 33 of each of the supporting units 3 has a plurality of anti-skid grooves 332 to enhance the friction between the braking end 214 of the brake member 212 of the back cover 21 and the toothed face 331 of the toothed member 33 of each of the supporting units 3.

The first positioning member 4 includes a pivot portion 41 pivotally . connected with the cover body 211 of the back cover 21, a protruding block 42 extending from the pivot portion 41 and abutting the braking end 214 of the brake member 212 of the back cover 21, and a handle 43 extending from the pivot portion 41 and located opposite to the protruding block 42.

Figure 5:
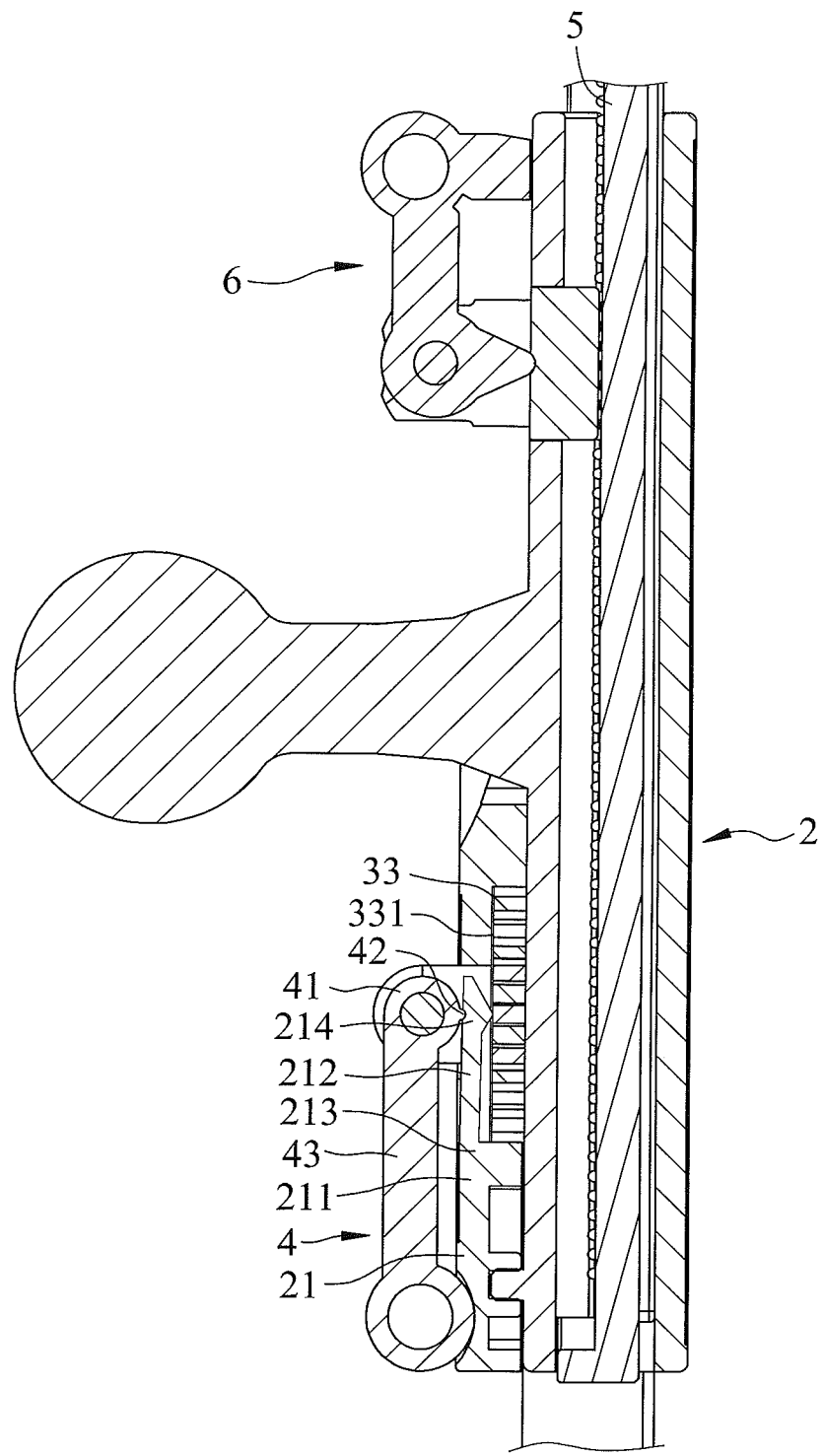
FIG. 5 is a cross-sectional view of the support rack taken along line V-V as shown in FIG. 3.
Figure 6:
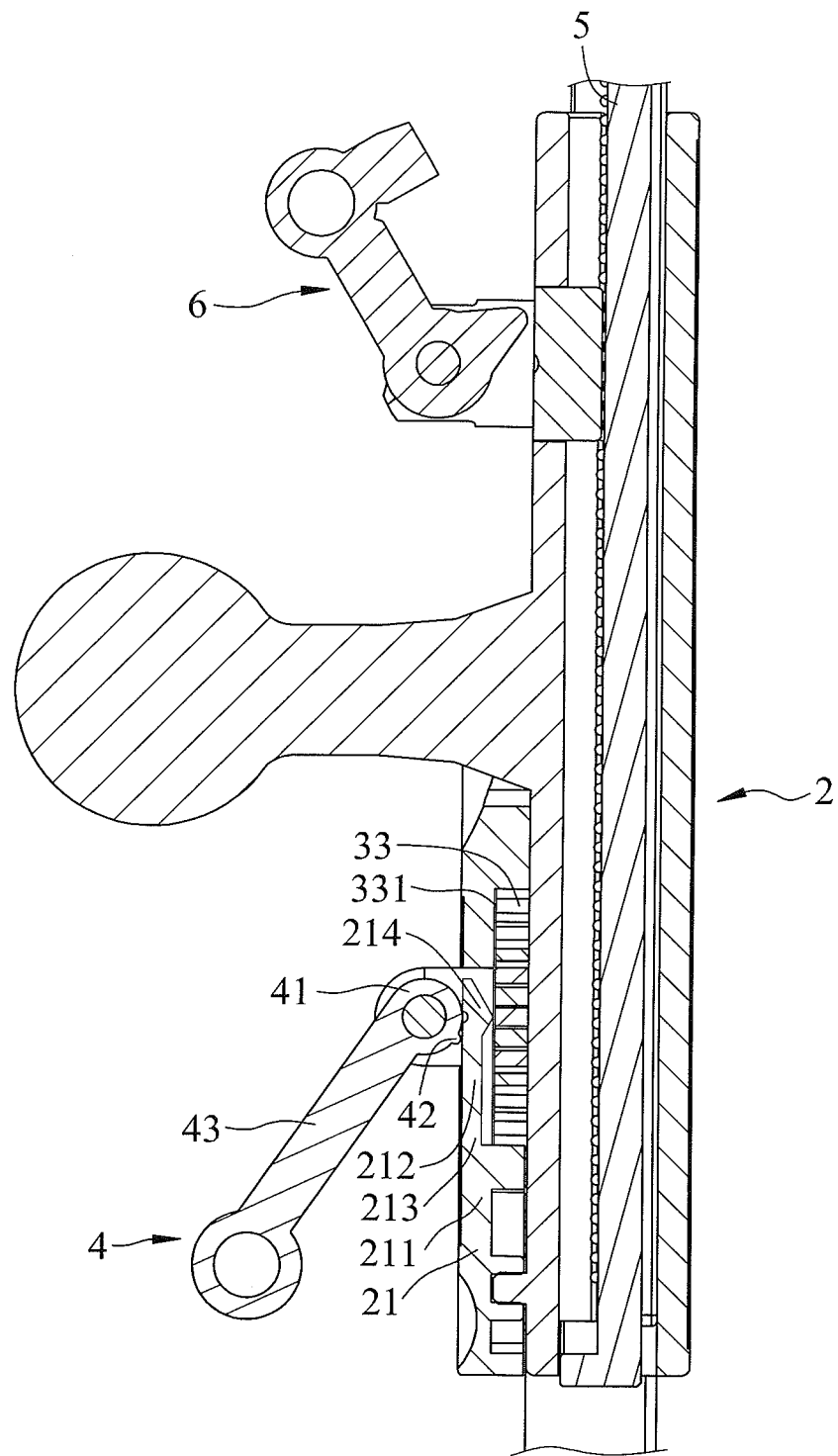
FIG. 6 is a schematic operational view of the support rack as shown in FIG. 5.

Referring to FIGS. 4-6, the first positioning member 4 is rotatable relative to the back cover 21 between a locked position and an unlocked position.

Figure 9:
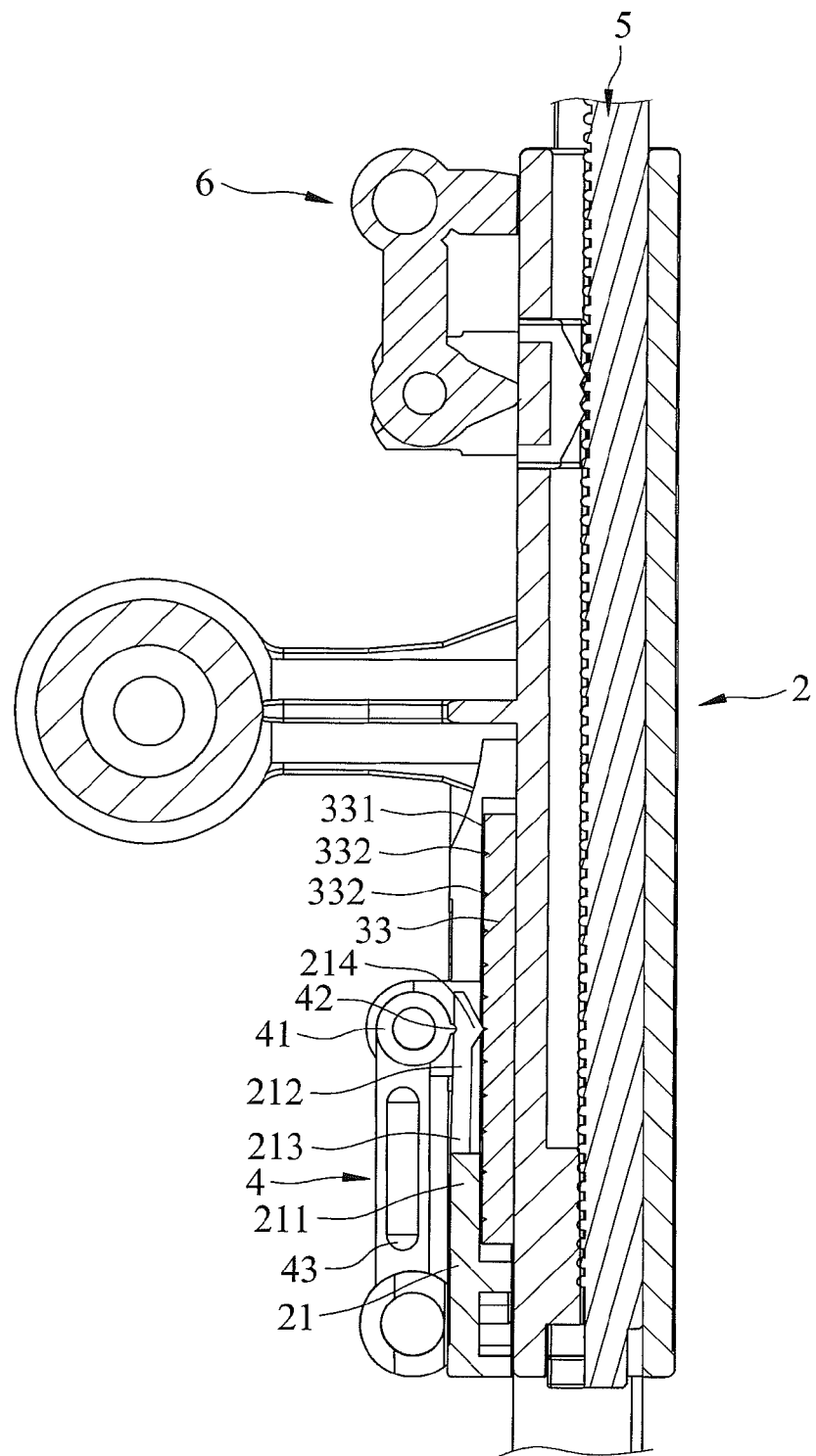
FIG. 9 is a cross-sectional view of the support rack taken along line IX-IX as shown in FIG. 3.

As shown in FIGS. 4 and 5, when the first positioning member 4 is disposed at the locked position, the handle 43 of the first positioning member 4 is adjacent to the back cover 21, the protruding block 42 of the first positioning member 4 abuts the braking end 214 of the brake member 212 of the back cover 21, and the braking end 214 of the brake member 212 of the back cover 21 engages the toothed face 331 of the toothed member 33 of each of the supporting units 3, and is inserted into and locked in one of the anti-skid grooves 332 (see FIG. 9) of the toothed face 331. Thus, the supporting units 3 are locked onto the base 2 by the first positioning member 4 to fix the angle between the support seats 31 and the distance between the resting members 32.

Figure 7:
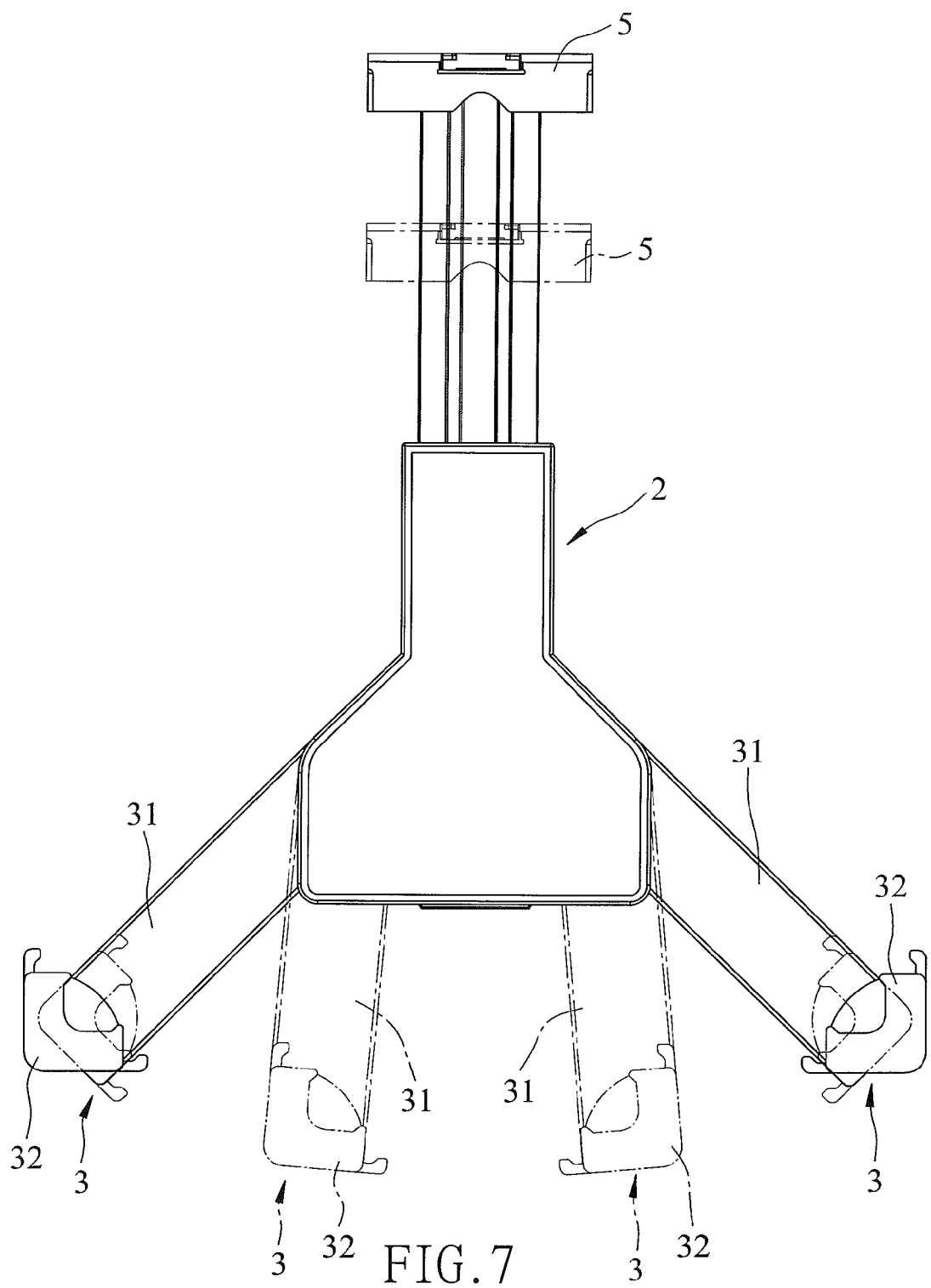
FIG. 7 is a front operational view of the support rack as shown in FIG. 4.

As shown in FIGS. 6 and 7, when the first positioning member 4 is disposed at the unlocked position, the handle 43 of the first positioning member 4 is spaced from the back cover 21, the protruding block 42 of the first positioning member 4 is detached from the braking end 214 of the brake member 212 of the back cover 21, and the braking end 214 of the brake member 212 of the back cover 21 disengages the toothed face 331 of the toothed member 33 of each of the supporting units 3, so that the supporting units 3 are unlocked from the base 2. Thus, the support seats 31 of the supporting units 3 are pivoted synchronously relative to the base 2 by intermeshing of the toothed members 33 to adjust the angle between the support seats 31 and the distance between the resting members 32.

The clamping member 5 is retractably mounted on the base 2 and extends upward from the base 2. The clamping member 5 is movable relative to the base 2 as shown in FIG. 7 to adjust the distance between the clamping member 5 and the base 2.

The second positioning member 6 is mounted on the base 2 to position the clamping member 5 on the base 2. The second positioning member 6 has a structure and an operational manner similar to that of the first positioning member 4, and will not be further described in detail.

Figure 8:
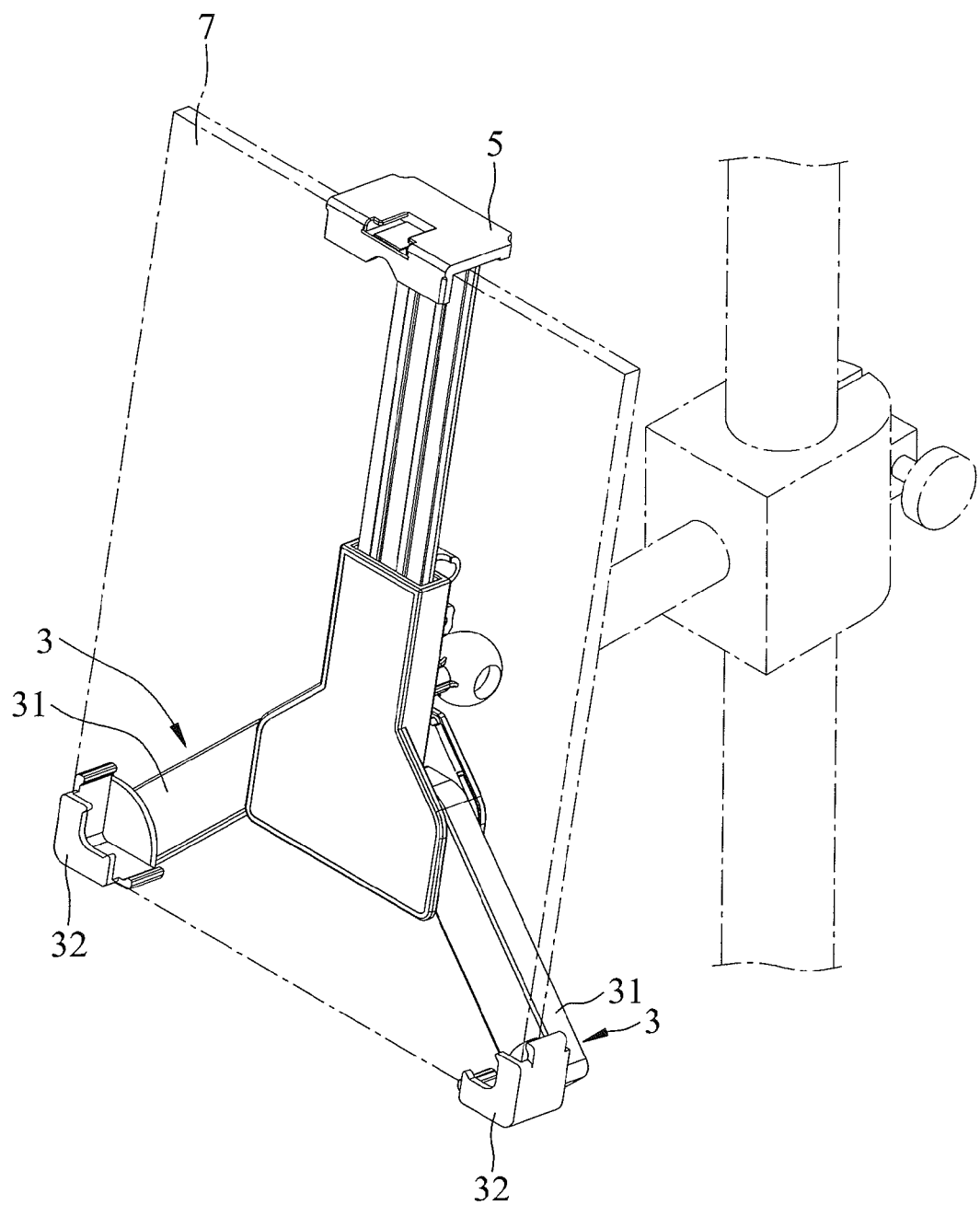
FIG. 8 is a schematic operational view of the support rack as shown in FIG. 4.

In operation, referring to FIGS. 7 and 8 with reference to FIGS. 5 and 6, the first positioning member 4 and the second positioning member 6 are respectively adjusted to the unlocked position, so that the support seats 31 of the supporting units 3 are pivotable relative to the base 2, and the clamping member 5 is movable relative to the base 2. Then, the support seats 31 of the supporting units 3 are pivoted relative to the base 2 to adjust the angle between the support seats 31 and the distance between the resting members 32, and the resting members 32 are rotated relative to the support seats 31 to adjust the angle of the resting members 32. Then, an article, such as a tablet computer 7, a book, a music score or the like, is placed on the supporting units 3. Then, the first positioning member 4 is adjusted to the locked position (see FIG. 9), so that the supporting units 3 are locked onto the base 2. Then, the clamping member 5 is pressed and moved downward to clamp the tablet computer 7. Then, the second positioning member 6 is adjusted to the locked position, so that the clamping member 5 is locked onto the base 2. Thus, the tablet computer 7 is placed on and supported by the support rack solidly and stably, thereby facilitating a user operating the tablet computer 7.

Referring to FIGS. 7 and 8, the distance between the supporting units 3 is adjusted by adjusting the opening angle of the support seats 31 and by adjusting the angles of the resting members 32, so that the width of the support rack can be adjusted. In addition, the clamping member 5 is movable relative to the base 2 to adjust the length the support rack. Thus, the width and the length of the support rack can be adjusted freely so that the support rack is available for articles of different sizes and specifications.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A support rack comprising:
a base and two supporting units, wherein:
each of the two supporting units includes a support seat;
the support seat of each of the two supporting units is pivotally connected with the base and extends downward;
the support seat of each of the two supporting units includes a pivot end pivotally connected with the base, and a mounting portion located opposite to the pivot end;
the pivot end of the support seat of each of the two supporting units is pivotable relative to the base to adjust a distance between the mounting portions of the two supporting units;
each of the two supporting units further includes a toothed member arranged on the support seat; and
the toothed members of the two supporting units mesh with each other so that the support seats of the two supporting units are pivoted synchronously.

2. The support rack of claim 1, wherein:
the toothed member of each of the two supporting units has an arcuate profile; and
the toothed members of the two supporting units mesh with each other along arcuate tangent lines.

3. The support rack of claim 1, further comprising:
a first positioning member mounted on the base for positioning the toothed member of each of the two supporting units.

4. The support rack of claim 3, wherein:
the toothed member of each of the two supporting units has a toothed face; and
the first positioning member abuts the toothed face of the toothed member of each of the two supporting units.

5. The support rack of claim 4, wherein:
the base includes a back cover covering the toothed member of each of the two supporting units;
the back cover has a cover body for mounting the first positioning member, and a brake member arranged on the cover body;
the brake member has a connecting end connected with the cover body and a braking end located opposite to the connecting end;
the first positioning member abuts the braking end of the brake member of the back cover; and
the braking end of the brake member of the back cover abuts and fixes the toothed face of the toothed member of at least one of the two supporting units.

6. The support rack of claim 5, wherein:
the first positioning member includes a pivot portion pivotally connected with the back cover of the base, a protruding block extending from the pivot portion and abutting the braking end of the brake member, and a handle located opposite to the protruding block;
the first positioning member is rotatable relative to the back cover between a locked position and an unlocked position;
when the first positioning member is disposed at the locked position, the protruding block of the first positioning member abuts the braking end of the brake member of the back cover; and
when the first positioning member is disposed at the unlocked position, the protruding block of the first positioning member is detached from the braking end of the brake member of the back cover.

7. The support rack of claim 6, wherein the toothed face of the toothed member of each of the two supporting units has a plurality of anti-skid grooves to enhance friction between the braking end of the brake member of the back cover and the toothed face of the toothed member of each of the two supporting units.

8. The support rack of claim 1, wherein each of the two supporting units further includes a resting member mounted on the mounting portion of the support seat.

9. The support rack of claim 1, further comprising:
a clamping member retractably mounted on the base and extending upward from the base.

10. A support rack comprising:
a base and two supporting units, wherein:
each of the two supporting units includes a support seat;
the support seat of each of the two supporting units is pivotally connected with the base and extends downward;
the support seat of each of the two supporting units includes a pivot end pivotally connected with the base, and a mounting portion located opposite to the pivot end;
the pivot end of the support seat of each of the two supporting units is pivotable relative to the base to adjust a distance between the mounting portions of the two supporting units;
each of the two supporting units further includes a resting member mounted on the mounting portion of the support seat;
the support seat of each of the two supporting units further includes a stepped slot formed in the mounting portion, and a pivoting hole formed in the mounting portion; and
the resting member of each of the two supporting units includes a holder, a limit rod formed on the holder and slidably mounted in the stepped slot, and a pivot shaft formed on the holder and pivotally mounted in the pivoting hole, so that the holder of the resting member of each of the two supporting units is pivotable relative to the support seat.

* * * * *